United States Patent

[11] 3,604,629

| [72] | Inventor | Francis J. Colville<br>Notts, England |
|---|---|---|
| [21] | Appl. No. | 1,071 |
| [22] | Filed | Jan. 5, 1970 |
| [45] | Patented | Sept. 14, 1971 |
| [73] | Assignee | Rolls Royce Limited<br>Derby, England |

[54] THRUST REVERSING MECHANISM
14 Claims, 3 Drawing Figs.

[52] U.S. Cl. ..................................................239/265.31,
60/229
[51] Int. Cl. ...................................................... B64c 15/04
[50] Field of Search............................................239/265.31,
265.19, 265.27, 265.29, 265.37, 265.33; 60/226,
229, 230, 232

[56] References Cited
UNITED STATES PATENTS
3,262,270  7/1966  Beavers...................... 60/230 X 3,497,165  2/1970  Sutton et al................... 60/230 X

*Primary Examiner*—M. Henson Wood, Jr.
*Assistant Examiner*—Michael Y. Mar
*Attorney*—Cushman, Darby & Cushman ABSTRACT: A ducted fan gas turbine jet propulsion engine has thrust reverser equipment in the fan cowl structure. Blocker doors or flaps are mounted peripherally of the fan cowl inner wall, and between adjacent blocker flaps there are fillet flaps also mounted so as to provide an uninterrupted surface in the fan cowl inner wall. The fillet flaps are pivotable on an axis generally parallel to the axis of the engine so that when the flaps are pivoted they lie edge on to fan air flowing through the reverser equipment. Each fillet flap has at least one side aerodynamically shaped so as to create a pressure differential on opposite sides thereof when the blocker flaps are in blocking position, and thus reduce or prevent "positional hunting" of the fillet flaps in the airflow.

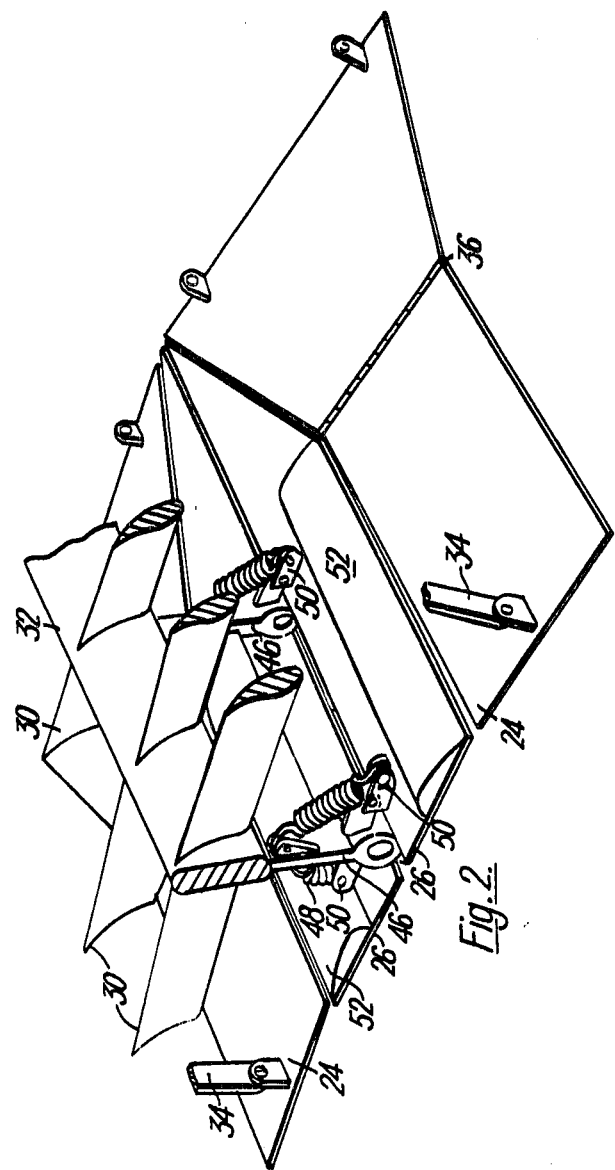

3,604,629

THRUST REVERSING MECHANISM

This invention concerns thrust reversers for gas turbine jet propulsion engines.

According to the present invention there is provided a thrust reverser for controlling the flow of fluid through an aperture in a cowl structure, the valve thrust reverser comprising at least one flap member mounted within the aperture and movable from a first position wherein it at least partly obturates the aperture, to a second position wherein both sides are exposed to the flow of fluid therethrough and parallel therewith, the flap member being adapted to impart to fluid flowing past one side thereof, flow characteristics different from the flow characteristics of the fluid flow past the other side thereof so as to create a pressure differential therebetween.

Preferably the flap member is mounted in the cowl structure of a fan duct of a gas turbine jet propulsion fan engine and forms a movable part of the inner wall thereof.

Preferably the aperture comprises an outlet in the cowl of a gas turbine jet propulsion fan engine, wherethrough fan air may be directed for the purpose of providing reverse thrust.

Preferably a plurality of said flap members are provided and are arranged circumferentially of said duct outer wall.

Preferably said flap members are mounted in pairs, each pair being spaced from the next adjacent pair by further flap members.

Preferably said flap members are arranged with their greater dimension longitudinally of the fan duct and are adapted to pivot about an axis parallel with the fan duct axis from said first position.

Preferably the said at least one flap member has at least part of one side aerodynamically shaped whereby to assist the flow of fluid thereover when said flap member is in said second position.

Preferably when not in use the aperture is at least partly obturated at its radially inner end by the said at least one flap member and is substantially completely obturated at its radially outer end by a portion of the cowl member, that is, radially with respect to the axis of the engine.

Preferably said cowl portion is movable from the portion in which it covers the aperture to a position wherein it uncovers the aperture so as to permit the fluid to flow radially outwards to atmosphere.

Preferably guide vanes are provided within the space defining the aperture whereby to deflect the fluid flowing radially outwards therethrough, so as to give said fluid a forward component and thus provide a reverse thrust effect.

Preferably the at least one flap is spring-urged to the position wherein it at least partly obturates the aperture, the spring or springs being adapted to collapse under pressure from the fluid flowing in the fan duct when the cowl portion is moved and thereby unobturate the aperture.

Preferably the fluid is air.

The invention will now be described with reference to the accompanying drawings in which:

FIG. 2 is a pictorial part view of a flap assembly, and

Figure 1:
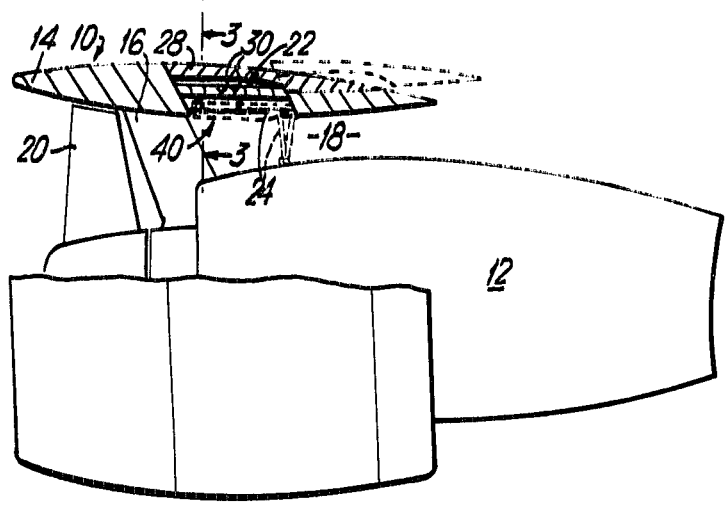
FIG. 1 is a diagrammatic, part sectional view of a gas turbine jet propulsion ducted fan engine.

In FIG. 1, a gas turbine jet propulsion ducted fan engine 10 comprises a gas turbine jet propulsion engine enclosed within a casing 12, a cowl 14 surrounding the engine casing and rigidly spaced therefrom with a plurality of struts 16 so as to provide an annular fan duct 18 therebetween, and a single stage of fan blades 20 mounted coaxially with the engine 12 for rotation within fan duct 18 at the upstream end thereof. That is, upstream relative to the direction of flow of air through the fan duct, as is meant throughout this specification.

Cowl 14 has fan air-reversing means mounted therein and which are indicated generally at 22 in FIG. 1. The reverser mechanism comprises two sets of circumferentially arranged, alternately spaced flaps 24 and 26, a translatable cowl portion 28 and a plurality of guide vanes 30, the vanes 30 lying within an aperture defined by cowl 14, cowl portion 28 and flaps 24 and 26. Furthermore vanes 30 extend circumferentially of cowl 14, within the aperture. Thus it will be seen that cowl 14 comprises fixed upstream and downstream portions, and the translatable midportion 28. The upstream and downstream portion are connected by rigid supports 32 which also serve to locate the guide vanes 30.

The downstream ends of flaps 24 are pivotally attached to the downstream portion of cowl 14 and the upstream ends of flaps 24 are linked by link 34 to the upstream lip of cowl portion 28. Flaps 24 also are hinged at 36 at approximately their midlength and the arrangement is that when thrust reversal is required, cowl portion 28 is translated downstream as shown by the dotted lines in FIG. 1, by rams or the like and, in doing so, exerts a force via links 34 on flaps 24, causing them to fold about hinge lines 36 and to pivot radially inwards to the position, again shown in dotted lines in FIG. 1 wherein they contact engine casing 12 and so obturate fan duct 18.

The geometry of the engine and fan duct dictate the profile of flaps 24. By this it is meant that the fan duct outer wall 40 made up by flaps 24 and 26 is a larger diameter than the fan duct inner wall which is comprised of the engine casing. Thus to extend the flaps from outer to inner wall calls for the flap edges to taper towards one another so that when extended, the edges lie on lines which radiate from the engine axis. It is thus unavoidable to leave spaces between adjacent flaps 24 when they are in their retracted or inoperative position and so flaps 26 are introduced to substantially fill the spaces and so provide a substantially unbroken outer fan duct wall under normal nonreversing conditions. However, flaps 26 must themselves be either removed or arranged such that during thrust reversal, air turned radially outwards by the extension of flaps 24 across duct 18 is not impeded. If it is, a considerable amount of thrust effect will be lost through choking of the aperture created by extension of flaps 24. Therefore, flaps 26 are split into two halves each half being pivotally attached to lugs 46 which are in turn, rigidly attached to supports 32. Flaps 26 are urged by coil springs 48 to the position wherein they form part of the fan duct outer wall 40, and the spring design is such that they keep flaps 26 in this position until thrust reversal is required. When this requirement arises, the following sequence of movements takes place:

Cowl portion 28 is pushed in a downstream direction by rams or the like (not shown). Air which has leaked between the edges of all flaps, from fan duct 18 to the space wherein lie the guide vanes 30 and which, until said movement of cowl 28 takes place, has, to a large extent pressure balanced all the flaps in a radial direction relative to the engine axis, now escapes outwardly of cowl 14 and causes a pressure drop radially across the flaps, the low-pressure side being the side radially outwardly thereof.

Figure 3:
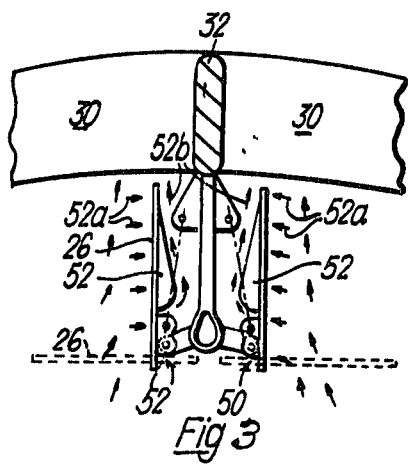
FIG. 3 is a sectional part view on line 3—3 of FIG. 1.

Thus the pressure which the air in the fan duct now exerts on the radially inner surfaces of flaps 26 is sufficiently high to overcome the action of the springs 48 and causes the flaps to pivot about center 50 to a position as shown in dotted lines in FIG. 1 and in full lines in FIG. 3. The air flows radially outwards passed flaps 26, to guide vanes 30 and is thereby directed forwardly so as to provide reverse thrust.

As flaps 26 are opened only by air pressure, it is essential to guard against the flaps being pressure-balanced when they are in some position between fully shut and fully open, which could happen because when the flaps start to move, air is able to flow over both sides thereof. Thus, one side of each half of flaps 26 is provided with, or formed into, an airfoil shape 52 so as to cause the air to flow thereover without exerting any pressure or substantially no pressure thereon, whilst on the sides not so formed, the air presses equally on the entire surface. It will be seen therefore that, as shown in FIG. 3, the respective flap halves of only one flap will be biased towards each other, the air pressure acting on, or flowing past, each side as indicated by the arrows 52a and 52b. A further advantage this arrangement provides is that the flaps are prevented from fluttering in the air stream as a result of slight and unavoidable, variations in the flow of air through the duct 18 and aperture.

The engine 10 as described heretofore is intended for use as the power plant for an aircraft (not shown) and, when in use as such, would be mounted on, in or adjacent the wings and or fuselage thereof. When the aircraft is taking off or is in level flight, the engine or engines is or are passing air straight through the fan duct 18, but when the aircraft has landed, in order to reduce its speed more rapidly than normally, the reverse thrust mechanism is actuated so that cowl portion 14 is moved downstream, flaps 24 are pivoted substantially radially across fan duct 18, in abutting relationship with each other, each half of flaps 26 is pivoted so as to substantially unblock the remainder of the thrust reverser aperture, and thus fan air flows through the aperture and deflected forwardly, or in an upstream direction, slowing the aircraft's forward speed.

WHAT WE CLAIM IS:

1. A thrust reverser for controlling the flow of fluid through an aperture in a cowl structure defining a wall of a fan duct of a ducted fan-type of gas turbine jet propulsion engine, the thrust reverser comprising at least one flap member mounted within the aperture and movable from a first position wherein it at least partly obturates the aperture, to a second position wherein both sides of the flap member are exposed to the flow of fluid therethrough and are parallel therewith, said flap member having a configuration for imparting to fluid flowing past one side thereof, flow characteristics different from the flow characteristics of the fluid flowing past the other side thereof so as to create a pressure differential therebetween.

2. A thrust reverser as claimed in claim 1 wherein the at least one side of the at least one flap member has at least a portion thereof formed into an airfoil shape.

3. A thrust reverser as claimed in claim 1 wherein the at least one flap member is spring urged into its obturating position.

4. A thrust reverser as claimed in claim 2 wherein the flap member is mounted for pivotal movement to the second position whereby to present the leading edge of said airfoil shape to the flow of fluid through the aperture.

5. A thrust reverser as claimed in claim 1 wherein the at least one flap member comprises part of the outer wall of the fan duct of said engine.

6. A thrust reverser as claimed in claim 5 wherein a plurality of said flap members are arranged in pairs circumferentially of said cowl structure and each pair being alternately spaced in relationship with further blocker flap members.

7. A thrust reverser claimed in claim 6 wherein said further blocker flap members are adapted to selectively block off the fan duct so as to prevent fluid flowing through the duct axially thereof.

8. A thrust reverser as claimed in claim 1 wherein said cowl structure has a portion movable axially of the fan duct between positions covering and opening said aperture.

9. A valve as claimed in claim 8 wherein the flap members, aperture and movable cowl portion are aligned radially of the engine axis.

10. A valve as claimed in claim 9 wherein guide vanes are provided in said aperture between said cowl portion and said flap members whereby to guide or deflect fluid flowing therethrough.

11. In a gas turbine jet propulsion engine of the ducted fan-type:
a fan cowl structure surrounding a casing of said engine and defining therewith a fan duct, said fan cowl structure having an aperture therethrough;
a thrust reverser mechanism for deflecting fan duct fluid through said aperture in said fan cowl structure from its normal flow path, said thrust reverser mechanism comprising a plurality of circumferentially spaced blocker flaps movable between a position partially obturating the aperture of said cowl structure and a position blocking off the fan duct and deflecting the fluid through the aperture, fillet flap means carried by said cowl structure intermediate adjacent blocker flaps when said blocker flaps are partially obturating the aperture to thereby completely obturate the aperture, said fillet flap means being operated to an open position under pressure from deflected fluid when said blocker flaps are in position to block the fan duct.

12. A gas turbine jet propulsion engine as claimed in claim 11, in which each fillet flap means includes a pair of flap members arranged to pivot on an axis generally parallel to the axis of the engine.

13. A gas turbine jet propulsion engine as claimed in claim 12, including resilient means normally urging said fillet flap members to their position partially obturating the aperture.

14. A gas turbine jet propulsion engine as claimed in claim 12, in which said fillet flap members have an airfoil configuration on at least one side thereof so as to create a pressure differential thereon and prevent hunting when said fillet flap members are pivoted to an unobturating position by pressure of fluid flowing through the aperture.

UNITED STATES PATENT OFFICE
CERTIFICATE OF CORRECTION

Patent No. 3,604,629                    Dated September 14, 1971

Inventor(s) Francis J. Colville

It is certified that error appears in the above-identified patent and that said Letters Patent are hereby corrected as shown below:

In the above identified patent, please add the following to the front page format after the "Assignee":

[32]  Priority  January 31, 1969

[33]            Great Britain

[31]            5545/69

Signed and sealed this 7th day of March 1972.

(SEAL)
Attest:

EDWARD M. FLETCHER, JR.            ROBERT GOTTSCHALK
Attesting Officer                   Commissioner of Patents